United States Patent [19]

Jacobs

[11] 3,857,751
[45] Dec. 31, 1974

[54] COMPOSITE SHEET CAPABLE OF WITHSTANDING IMPINGEMENT BY PARTICULATE MATERIALS

[75] Inventor: Leland Harnden Jacobs, Darlingscott, near Shipston-on-Stour, England

[73] Assignee: Tufdura Limited

[22] Filed: Nov. 15, 1971

[21] Appl. No.: 198,817

[52] U.S. Cl................ 161/89, 161/92, 161/95, 161/96, 161/112, 161/166, 156/137, 209/397
[51] Int. Cl................................. B32b 7/02
[58] Field of Search ........... 209/392, 397, 398, 399, 209/401; 161/89, 95, 96, 112, 114, 115, 166, 92; 156/137, 164, 163

[56] References Cited
UNITED STATES PATENTS

| | | | |
|---|---|---|---|
| 989,796 | 4/1911 | Patterson | 161/96 X |
| 1,155,018 | 9/1915 | Towne | 161/96 |
| 1,209,986 | 12/1916 | Mason | 161/96 |
| 1,448,180 | 3/1923 | Atwood | 161/96 X |
| 1,718,385 | 6/1929 | Sherwood | 209/397 |
| 2,155,586 | 1/1940 | Brooks | 161/95 X |
| 2,358,189 | 9/1944 | Sprigg | 161/96 X |
| 2,405,987 | 8/1946 | Arnold | 161/115 X |
| 2,644,280 | 7/1953 | O'Neil | 161/166 X |
| 2,875,116 | 2/1959 | Smith | 161/96 X |
| 2,917,422 | 12/1959 | Waller | 156/164 |
| 3,058,864 | 10/1962 | Pechin | 156/137 X |
| 3,129,806 | 4/1964 | Stiltner | 156/137 X |
| 3,551,273 | 12/1970 | McKinney | 161/166 X |
| 3,564,819 | 2/1971 | Neulander | 55/158 |

FOREIGN PATENTS OR APPLICATIONS

| | | | |
|---|---|---|---|
| 443,458 | 1/1935 | Great Britain | 156/163 |
| 470,331 | 8/1937 | Great Britain | 156/163 |
| 10,838 | 1/1902 | Norway | 161/112 |
| 985,337 | 3/1965 | Great Britain | 55/490 |
| 1,151,430 | 7/1963 | Germany | 209/401 |
| 1,252,788 | 12/1960 | France | 161/96 |
| 1,912,870 | 10/1969 | Germany | 209/397 |

Primary Examiner—Robert Halper
Attorney, Agent, or Firm—Mawhinney & Mawhinney

[57] ABSTRACT

A composite sheet, particularly for use as a screen plate to pass particles below a predetermined size, in which case the sheet has holes punched through the sheet from the face remote from that against which the particles to be screened will impinge. The sheet is formed from three layers of elastomeric sheet material bonded together with intervening layers of a woven, mesh-like material held in a resiliently pre-stressed tensile condition in at least one direction of the mesh during bonding. The intermediate layer of elastomeric material is softer than the outer layers of elastomeric material.

3 Claims, 1 Drawing Figure

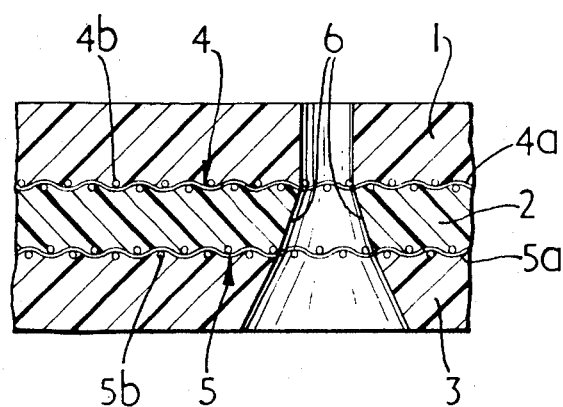

COMPOSITE SHEET CAPABLE OF WITHSTANDING IMPINGEMENT BY PARTICULATE MATERIALS

The invention relates to a composite sheet capable of withstanding impingement by particulate materials and is particularly, but not exclusively, concerned with a composite sheet to be used as a screen for grading or as a deflector plate or a belt for conveying particulate material being a product from mining or quarrying operations.

An object of the invention is to provide a sheet having a longer life than known screens or belts used respectively for the grading or conveying of such particulate materials and another object is to provide a screen plate which will result in more efficient screening.

According to the invention, the composite sheet comprises three layers of elastomeric sheet material bonded together with intervening layers of a woven, mesh-like material, the layers of woven, mesh-like material being held in a resiliently pre-stressed tensile condition in at least one direction of the mesh during the bonding process.

Preferably, the intermediate layer of elastomeric material is softer than the outer layers of elastomeric material. Each of the outer layers of elastomeric material may have substantially the same hardness as the other outer layer. Conveniently, each of the outer layers of elastomeric material has a Shore Hardness Number of between 60 and 65 and the intermediate layer of elastomeric material has a Shore Hardness Number of between 35 and 40.

The layers of woven, mesh-like material may be pre-stressed in either the direction of the warps or the wefts thereof, or both. The threads to be pre-stressed are conveniently of or are reinforced by polyester threads. The threads to be pre-stressed are preferably pre-stressed by approximately 5 percent of their unstressed length at a stress not exceeding 10 percent of their breaking stress, while the elastomeric layers are being bonded to the intervening layers of woven, mesh-like material and through the intervening layers to each other.

Where the composite sheet is to be used as a screen plate to pass particles below a predetermined size, the sheet may have holes therein for the passage through the screen plate of the said particles, the holes being punched through the sheet from the rear face thereof, that is the face remote from that against which the particles to be screened will impinge. The holes may be of any convenient cross-section, for example they may be circular or rectangular.

One embodiment of composite sheet in accordance with the invention is now described with reference to the accompanying drawing, which is a cross-section through the plate in the warp direction of the woven, mesh-like layers.

Referring to the drawing, the composite sheet comprises a top layer 1, an intermediate layer 2 and a bottom layer 3 of elastomeric sheet material. This may be a natural rubber or a synthetic rubber or other synthetic plastics, rubber-like material. Between the two layers 1 and 2 there is a layer of a woven mesh-like material 4 and between the layers 2 and 3 there is a layer 5 of a similar woven, mesh-like material. In each of the layers 4 and 5, the warp threads are indicated by 4a and 5a respectively and the weft threads are indicated at 4b and 5b respectively. The woven mesh-like layers may be of any convenient material and in this example they are woven from nylon threads reinforced in the warp direction by polyester threads to give greater tensile strength in that direction. The top and bottom layers of the elastomeric material 1 and 3 are considerably harder than the intermediate layer 2 and preferably have substantially the same hardness as each other. The rubber or other elastomeric material used for the top and bottom layers 1 and 3 conveniently has a Shore Hardness Number of between 60 and 65 and the rubber or other elastomeric material used for the intermediate layer 2 has a Shore Hardness Number of between 35 and 40.

The composite sheet is made by bonding the elastomeric layers 1, 2 and 3 and the intervening woven mesh-like layers 4 and 5 together through the intervening woven mesh-like layers 4 and 5 by using a suitable cement or adhesive and if appropriate by the application of heat and pressure. During the bonding process, the woven, mesh-like layers 4 and 5 are resiliently pre-stressed tensilely in the direction of the warp threads and are held in tension until the bonding process has been completed. The warp threads 4a and 5a are pre-stressed by approximately 5% of their unstressed length at a stress not exceeding 10% of their breaking stress. The resulting sheet will therefore have the intermediate elastomeric layer 2 pre-stressed in tension and the outer elastomeric layers 1 and 3 pre-stressed in compression, as the woven mesh-like layers 4 and 5 recover from their stressed condition after the bonding process has been completed.

Where the composite sheet is to be used as a screen plate, holes of a desired size are formed in it by punching from the face which will be underneath in use, that is through the layer 3. The holes may be of square or circular cross-section or any other desired shape and due to the resilience of the elastomeric layers they will be bell-mouthed as indicated at 6 in the drawing.

Where the composite sheet is used as a screen plate or as a deflector or a conveyor belt, it is supported in use in tension in the warp direction of the woven, mesh-like layers 4 and 5; but the sheet could be used for other purposes such as lining a chute where it would be secured by adhesive to the surface to be lined.

Although the woven mesh-like layers 4 and 5 have been described as being pre-stressed in their warp directions, they could be pre-stressed in their weft directions or in both the warp and weft directions. Where the threads are to be prestressed in both the warp and the weft directions the material used is conveniently 100% polyester fabric.

The provision of the pre-stressed woven, mesh-like layers 4 and 5 enables a greater free screening area to be achieved, because there can be narrower bridges between the holes 6 and also square holes can be used without risk of cracking at the corners of the holes. The composite sheet provided by this invention has a much greater tensile strength than known rubber screen plates and therefore a screen plate in accordance with this invention has a considerably greater resistance to impact and a considerable stability under tension. This is because the woven, mesh-like layers 4 and 5 leave the rubber or other elastomeric layers in a relaxed condition and in that condition there is less risk of the elastomeric layers becoming cut or damaged by the particulate material being handled. Due to the pre-stressing of the woven, mesh-like layers 4 and 5 far greater loads can be supported than by known rubber screen plates. Furthermore due to the greater strength of the composite sheet, there is less risk of failure of the sheet adjacent to the fittings necessary to hold it in tension.

Other advantages of the composite sheet are due to the cushioning effect of the intermediate elastomeric layer 2. As this layer is softer than the outer layers, the impact resistance of the composite sheet is improved leading to a longer life of the outer layer 1. In this respect the soft intermediate layer 2 acts in a similar way to the air in a pneumatic tyre. This is due to the fact that, although rubber is incompressible, the intermediate layer of softer rubber 2 is displaceable in the regions of the perforations 6. Thus where the composite sheet is perforated as a screen plate, the intermediate layer of softer rubber 2 is easily displaceable and can act as if it were a compressible medium, such as air in a tyre. The intermediate layer 2 also has considerable abrasion resistance and controls wear on the side walls of holes through the composite sheet. The intermediate layer 2 has also been found to amplify the natural frequency of the composite sheet, thereby leading to its more efficient use as a screen. It has also been found that the softness of the intermediate layer and the resilience of the composite sheet as a whole reduces the tendency for the holes 6 to become blocked by the particulate material being graded by the screen.

The material in accordance with this invention also has the advantages that it is quieter in operation and is gentle with the particulate material it handles. This is important in the case of material such as coal where degeneration of the lump size is to be avoided.

What I claim as my invention and desire to secure by Letters Patent of the United States is:

1. A composite sheet capable of withstanding impingement by particulate materials and comprising three superimposed layers of elastomeric sheet material of which the inner layer is softer than the two outer layers, a layer of a woven, mesh-like material positioned between each pair of adjacent layers of said elastomeric sheet material, and a bonding material securing the layers of elastomeric sheet material together through said intervening layers of woven, mesh-like material, said layers of woven, mesh-like material being held in a resiliently pre-stressed tensile condition in at least one direction of the mesh by the layers of elastomeric sheet material until the bonding of the layers together has been completed.

2. A sheet as claimed in claim 1 in which each of the outer layers of elastomeric material has substantially the same hardness as the other outer layer.

3. A sheet as claimed in claim 2 in which each of the outer layers of elastomeric material has a Shore Hardness Number of between 60 and 65 and the inner layer of elastomeric material has a Shore Hardness Number of between 35 and 40.

* * * * *